(12) United States Patent
Chan et al.

(10) Patent No.: US 10,269,806 B2
(45) Date of Patent: *Apr. 23, 2019

(54) SEMICONDUCTOR STRUCTURES WITH DEEP TRENCH CAPACITOR AND METHODS OF MANUFACTURE

(71) Applicant: INTERNATIONAL BUSINESS MACHINES CORPORATION, Armonk, NY (US)

(72) Inventors: Kevin K. Chan, Staten Island, NY (US); Sivananda K. Kanakasabapathy, Pleasanton, CA (US); Babar A. Khan, Ossining, NY (US); Masaharu Kobayashi, Tokyo (JP); Effendi Leobandung, Stormville, NY (US); Theodorus E. Standaert, Clifton Park, NY (US); Xinhui Wang, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/940,009

(22) Filed: Mar. 29, 2018

(65) Prior Publication Data

US 2018/0225405 A1  Aug. 9, 2018

Related U.S. Application Data

(60) Continuation of application No. 15/285,520, filed on Oct. 5, 2016, now Pat. No. 10,042,968, which is a
(Continued)

(51) Int. Cl.
*H01L 27/108* (2006.01)
*H01L 27/07* (2006.01)
(Continued)

(52) U.S. Cl.
CPC .... *H01L 27/10832* (2013.01); *G06F 17/5045* (2013.01); *G06F 17/5068* (2013.01);
(Continued)

(58) Field of Classification Search
CPC ......... H01L 27/10832; H01L 27/10826; H01L 27/10858; H01L 27/10879; H01L 21/845;
(Continued)

(56) References Cited

U.S. PATENT DOCUMENTS 7,674,674 B2   3/2010   Furukawa et al.
7,811,881 B2   10/2010  Cheng et al.
(Continued)

OTHER PUBLICATIONS

Notice of Allowance dated Mar. 28, 2018, in related U.S. Appl. No. 15/285,520, 28 pages.
(Continued)

*Primary Examiner* — Marcos D. Pizarro
*Assistant Examiner* — Nelson Garces
(74) *Attorney, Agent, or Firm* — Steven Meyers; Andrew M. Calderon; Roberts Mlotkowski Safran Cole & Calderon P.C.

(57) ABSTRACT

An integrated FinFET and deep trench capacitor structure and methods of manufacture are disclosed. The method includes forming at least one deep trench capacitor in a silicon on insulator (SOI) substrate. The method further includes simultaneously forming polysilicon fins from material of the at least one deep trench capacitor and SOI fins from the SOI substrate. The method further includes forming an insulator layer on the polysilicon fins. The method further includes forming gate structures over the SOI fins and the insulator layer on the polysilicon fins.

12 Claims, 7 Drawing Sheets

Related U.S. Application Data continuation of application No. 14/511,413, filed on Oct. 10, 2014, now Pat. No. 9,576,096, which is a division of application No. 13/804,647, filed on Mar. 14, 2013, now Pat. No. 8,987,800.

(51) Int. Cl.

| | | |
|---|---|---|
| *H01L 27/12* | (2006.01) | |
| *H01L 29/94* | (2006.01) | |
| *H01L 21/28* | (2006.01) | |
| *H01L 29/78* | (2006.01) | |
| *H01L 21/84* | (2006.01) | |
| *G06F 17/50* | (2006.01) | |
| *H01L 29/66* | (2006.01) | |
| *H01L 49/02* | (2006.01) | |
| *H01L 29/04* | (2006.01) | |
| *H01L 29/06* | (2006.01) | |
| *H01L 29/51* | (2006.01) | |
| *H01L 27/06* | (2006.01) | |

(52) U.S. Cl.
CPC .......... *G06F 17/5072* (2013.01); *H01L 21/84* (2013.01); *H01L 21/845* (2013.01); *H01L 27/0733* (2013.01); *H01L 27/10826* (2013.01); *H01L 27/10829* (2013.01); *H01L 27/10858* (2013.01); *H01L 27/10867* (2013.01); *H01L 27/10879* (2013.01); *H01L 27/1203* (2013.01); *H01L 27/1211* (2013.01); *H01L 28/40* (2013.01); *H01L 29/04* (2013.01); *H01L 29/0649* (2013.01); *H01L 29/517* (2013.01); *H01L 29/66181* (2013.01); *H01L 29/945* (2013.01); *H01L 27/0629* (2013.01)

(58) Field of Classification Search
CPC . H01L 29/0649; H01L 29/04; H01L 27/1211; H01L 28/40; H01L 29/517; H01L 21/84; H01L 27/0733; H01L 27/1203; H01L 29/66181; H01L 29/945; H01L 27/0629; H01L 27/10829; H01L 27/10844; H01L 27/10847; H01L 27/10861; H01L 29/49; H01L 29/66545; H01L 29/66666; H01L 29/7827; H01L 27/1087; H01L 27/10894; H01L 21/26586; H01L 27/10876; H01L 27/10891; H01L 31/112; H01L 27/108; H01L 27/12; H01L 29/66621; H01L 29/93; H01L 21/00; H01L 27/0248; H01L 27/0255; H01L 27/10867; H01L 29/7841; H01L 21/2257; H01L 27/0207; H01L 27/10802; H01L 27/10805; H01L 27/10823; G06F 17/5068; G06F 17/5045; G06F 17/5072
USPC .................................................. 257/298–305
See application file for complete search history.

(56) References Cited

U.S. PATENT DOCUMENTS

| | | |
|---|---|---|
| 8,779,490 B2 | 7/2014 | Khan et al. |
| 8,928,057 B2 | 1/2015 | Cote et al. |
| 9,576,096 B2 * | 2/2017 | Chan ...................... H01L 21/84 |
| 10,050,039 B2 | 8/2018 | Chan et al. |
| 2006/0022248 A1 | 2/2006 | Fischer et al. |
| 2008/0318377 A1 | 12/2008 | Lee et al. |
| 2009/0206443 A1 | 8/2009 | Juengling |
| 2010/0041191 A1 | 2/2010 | Anderson et al. |
| 2010/0232212 A1 | 9/2010 | Anderson et al. |
| 2011/0175152 A1 | 7/2011 | Booth, Jr. et al. |
| 2011/0182098 A1 | 7/2011 | Liaw |
| 2011/0233634 A1 | 9/2011 | Cai et al. |
| 2011/0248326 A1 | 10/2011 | Kanakasabapathy et al. |
| 2011/0278676 A1 | 11/2011 | Cheng et al. |
| 2012/0018789 A1 | 1/2012 | Juengling |
| 2012/0040233 A1 * | 2/2012 | Kim ...................... C23C 14/562 |
| | | 429/152 |
| 2013/0005129 A1 | 1/2013 | Kanakasabapathy et al. |
| 2013/0320422 A1 * | 12/2013 | Chang ............... H01L 27/10826 |
| | | 257/301 |
| 2014/0027831 A1 | 1/2014 | Basker et al. |

OTHER PUBLICATIONS

Notice of Allowance dated Apr. 4, 2018 ,in related U.S. Appl. No. 15/399,057, 24 pages.
Office Action dated Sep. 25, 2018, in related U.S. Appl. No. 14/601,288, 10 pages.
Office Action dated Sep. 20, 2018, in related U.S. Appl. No. 15/995,800, 15 pages.

* cited by examiner

US 10,269,806 B2

SEMICONDUCTOR STRUCTURES WITH DEEP TRENCH CAPACITOR AND METHODS OF MANUFACTURE

FIELD OF THE INVENTION

The invention relates to semiconductor structures and methods of manufacture and, more particularly, to an integrated FinFET and deep trench capacitor structure and methods of manufacture.

BACKGROUND

FinFETs are three dimensional structures which provide excellent scalability. For example, FinFETs rise above the planar substrate, giving them more volume than conventional gate structures. Also, by wrapping the gate around the channel, little current is allowed to leak through the body when the device is in the off state, i.e., thereby providing low gate leakage current. This provides superior performance characteristics, e.g., lower threshold voltages, resulting in improved switching speeds and power.

FinFETs can be fabricated using, for example, silicon on insulator (SOI) substrates. In SOI technologies, FinFETs can be used with many other devices and structures, and can be fabricated using CMOS technologies, e.g., lithography, etching and deposition methods. However because of the three dimensional structure, integration with other devices and/or structures are difficult and quite challenging.

SUMMARY

In an aspect of the invention, a method comprises forming at least one deep trench capacitor in a silicon on insulator (SOI) substrate. The method further comprises simultaneously forming polysilicon fins from material of the at least one deep trench capacitor and SOI fins from the SOI substrate. The method further comprises forming an insulator layer on the polysilicon fins. The method further comprises forming gate structures over the SOI fins and the insulator layer on the polysilicon fins.

In an aspect of the invention, a method comprises forming deep trench capacitors in an SOI substrate. The method further comprises forming SOI fins from the SOI substrate. The method further comprises forming polysilicon fins from the deep trench capacitors. The method further comprises patterning the SOI fins such that ends of the SOI fins are in contact with the polysilicon. The method further comprises forming an insulator material on the polysilicon fins. The method further comprises forming gate structures on the SOI fins and the insulator material. The method further comprises forming a material on exposed materials of the SOI fins and polysilicon fins to connect the SOI fins and polysilicon fins.

In an aspect of the invention, a structure comprises a plurality of deep trench capacitors formed in a silicon on insulator (SOI) substrate, each of the plurality of deep trench capacitors having a fin structure. The structure further comprises a plurality of SOI fins each of which having ends in contact with respective fin structures of the deep trench capacitors. The structure further comprises an insulator material on the fin structures of the plurality of deep trench capacitors. The structure further comprises a gate structure extending over the insulator material and the SOI fins.

In another aspect of the invention, a design structure tangibly embodied in a machine readable storage medium for designing, manufacturing, or testing an integrated circuit is provided. The design structure comprises the structures of the present invention. In further embodiments, a hardware description language (HDL) design structure encoded on a machine-readable data storage medium comprises elements that when processed in a computer-aided design system generates a machine-executable representation of the integrated FinFET and deep trench capacitor structure, which comprises the structures of the present invention. In still further embodiments, a method in a computer-aided design system is provided for generating a functional design model of the integrated FinFET and deep trench capacitor structure. The method comprises generating a functional representation of the structural elements of the integrated FinFET and deep trench capacitor structure.

In embodiments, a method in a computer-aided design system generates a functional design model of an integrated FinFET and deep trench capacitor structure. The method comprises: generating a functional representation of a plurality of deep trench capacitors formed in a silicon on insulator (SOI) substrate, each of the plurality of deep trench capacitors having a fin structure; generating a functional representation of a plurality of SOI fins each of which having ends in contact with respective fin structures of the deep trench capacitors; generating a functional representation of an insulator material on the fin structures of the plurality of deep trench capacitors; and generating a functional representation of a gate structure extending over the insulator material and the SOI fins.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

DETAILED DESCRIPTION

The invention relates to semiconductor structures and methods of manufacture and, more particularly, to an integrated FinFET and deep trench capacitor structure and methods of manufacture. More specifically, the present invention comprises a method of manufacturing a robust connection between a FinFET and eDRAM semiconductor structure. By way of example, the processes of the present invention result in a structure with a robust connection between polysilicon material of the eDRAM (e.g., deep trench capacitor) and an SOI (silicon-on-insulator) fin of the FinFET, using epitaxial material. The connection between the SOI fin and polysilicon material of the eDRAM can be formed in a self-aligned process.

In more specific embodiments, the processes of the present invention integrate a deep trench capacitor (e.g., eDRAM) with an existing fin based CMOS process. In embodiments, the integration includes etching an SOI fin and polysilicon material (polysilicon fin) of the deep trench capacitor in same processes, with the connection of the SOI fin to polysilicon material (e.g., polysilicon fin of the deep trench capacitor) being formed in a self-aligned manner. In embodiments, the present invention uses a self-aligned growth process of epitaxial material to robustly connect the SOI fin and polysilicon fin of the deep trench capacitor. The epitaxial material on the polysilicon sidewall advantageously provides a reduced strap resistance between the SOI fin and polysilicon fin. In optional embodiments, the epitaxial material can be eliminated; although, this may impact the strap resistance, it has the potential for reducing fin to neighboring deep trench shorts. In embodiments, the processes of the present invention further include patterning a trench top oxide under a passing wordline (PWL) so that PWL to deep trench capacitor shorts can be avoided.

Figure 2:
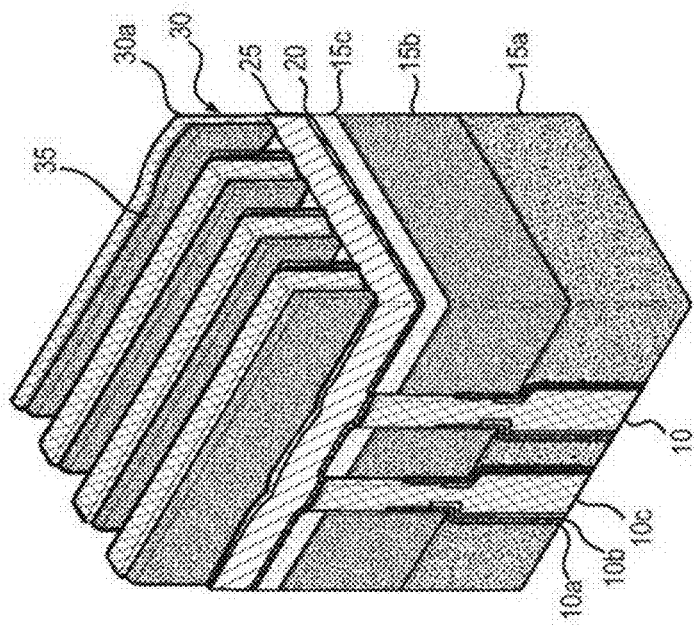
FIGS. 1-11 show fabrication processes and respective structures in accordance with aspects of the present invention.
Figure 1:
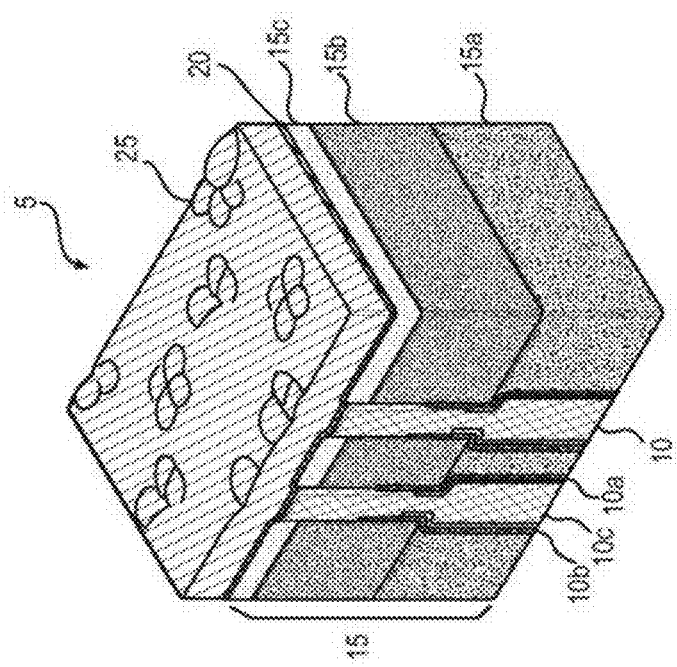

FIG. 1 shows a structure and respective processing steps in accordance with aspects of the present invention. More specifically, the structure 5 of FIG. 1 includes a deep trench capacitor 10 formed in a SOI substrate 15. The SOI substrate 15 can be fabricated using any conventional processes such as, for example, SiMOX or other known bonding techniques. By way of illustrative example, the substrate 15 includes a buried oxide layer 15b sandwiched between a Si wafer 15a and a semiconductor layer 15c. In embodiments, the semiconductor layer 15c can be any semiconductor material such as, for example, Si, SiGe, Ge, GaAs, as well as other III/V or II/IV compound semiconductors or any combinations thereof.

In embodiments, the deep trench capacitor 10 can be an eDRAM, formed using conventional processes and materials. For example, a deep trench is formed through the layers 15a, 15b and 15c, using conventional lithography and etching processes, e.g., isotropic etching processes. The deep trench is then lined with a dielectric material 10a, e.g., hafnium oxide or other high-k dielectric material. In embodiments, the dielectric material 10a can be any insulator material (not limited to a high-k dielectric) deposited to a thickness of about 1 nm to about 3 nm; although other thicknesses are also contemplated by the present invention. A metal layer 10b, e.g., TiN, is then deposited on the dielectric material 10a to a thickness of about 1 nm to about 3 nm; although other thicknesses are also contemplated by the present invention. The remaining portion of the trench is then filled with polysilicon material 10c. It should be understood by those of ordinary skill in the art that deposition methods of materials 10a, 10b and 10c may be formed using conventional deposition processes, e.g., atomic layer deposition (ALD).

Still referring to FIG. 1, a thin oxide material (hardmask) 20 is deposited on the layer 15c. The oxide material 20 can be deposited using a conventional plasma enhanced chemical vapor deposition (PECVD) process. In embodiments, a pad nitride film (SiN) 25 is deposited on the oxide material 20. The pad nitride film 25 can be deposited using PECVD processes, to a thickness of about 30 nm to 80 nm; although other material thicknesses are also contemplated by the present invention.

FIGS. 2-5 show a sidewall image transfer process in accordance with aspects of the present invention. More specifically, in FIG. 2, an amorphous silicon layer 30 is deposited on the pad nitride film 25. The amorphous silicon layer 30 can be deposited using, for example, a PECVD or CVD process. In embodiments, the amorphous silicon layer 30 can be deposited to a thickness of about 80 nm to 150 nm, and preferably about 2× the thickness of the pad nitride film 25. The amorphous silicon layer 30 then undergoes a lithographic and etching process to form mandrels 30a. An oxide sidewall deposition process is then performed, to form oxide sidewalls 35 on the sides of the mandrels 30a.

Figure 3:
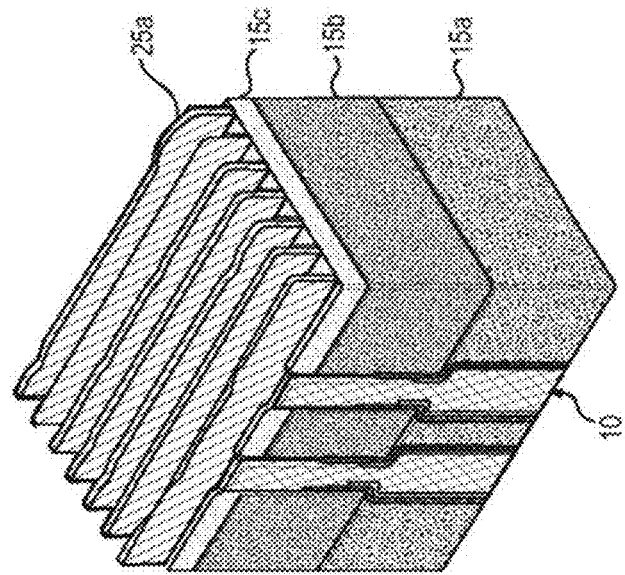

In FIG. 3, the mandrels 30a are removed, leaving the sidewalls 35. In embodiments, the removal of the mandrels is performed using a selective etchant, as should be known to those of skill in the art. In embodiments, the selective etchant can cause recesses 25a in the pad nitride film 25; although such recesses can be avoided by reducing the etch time.

Figure 4:
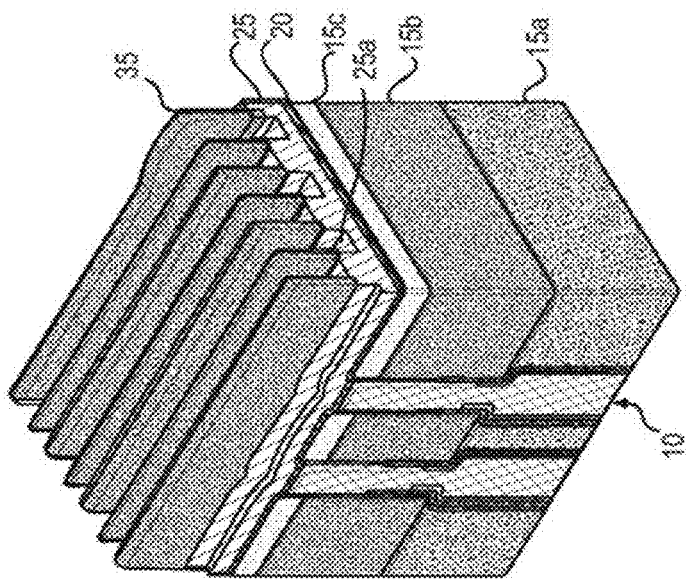

In FIG. 4, an anisotropic etching process is performed to transfer the sidewall pattern of the sidewalls to the underlying pad nitride film 25. This process forms nitride fins 25a. The sidewalls 35 are then removed using, for example, a sidewall image transfer spacer strip of, for example, oxide etchants with an anisotropic etching. By way of example, the oxide etchants can be an HF gas or vapor etch, or a SiCoNi, using a fluorine component to etch the oxide sidewalls.

Figure 5:
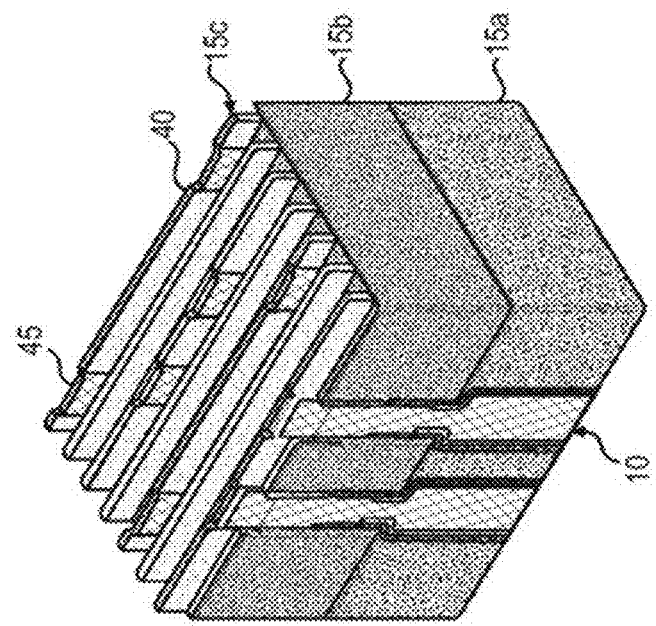

In FIG. 5, an anisotropic etching process is performed to transfer the sidewall pattern of the nitride fins 25a to the underlying layer 15c. This process forms SOI fins 40. This transfer etching process also forms polysilicon fins 45, contacting the SOI fins 40. The nitride fins 25a are then removed using, for example, a hot phosphorous etchant.

Figure 6:
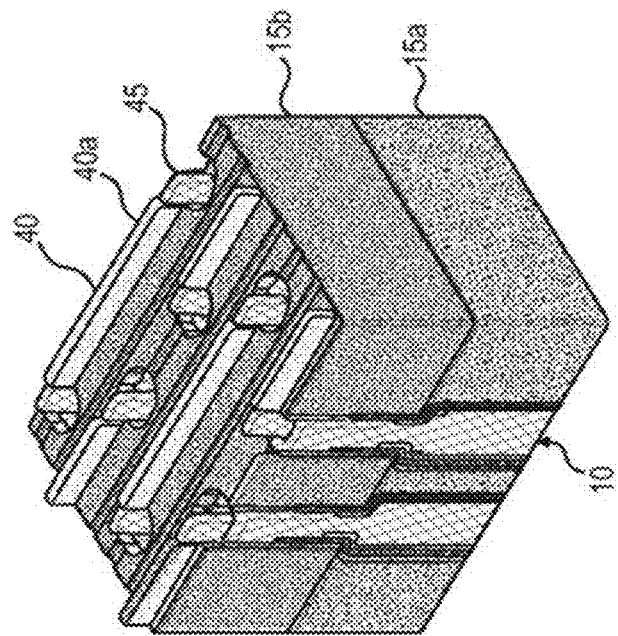

FIG. 6 shows additional processing steps and a respective structure in accordance with aspects of the present invention. More specifically, the SOI fins 40 are patterned using conventional lithography and etching processes. In this patterning, ends 40a of the SOI fins 40 remain in contact with the polysilicon fins 45. This contact will provide a connection between the FinFET and a deep trench capacitor (eDRAM), i.e., SOI fins 40 and polysilicon fins 45. The thin oxide material (oxide material 20, shown in FIG. 1) can also be removed using a dilute HF (DHF) etching process.

Figure 7:
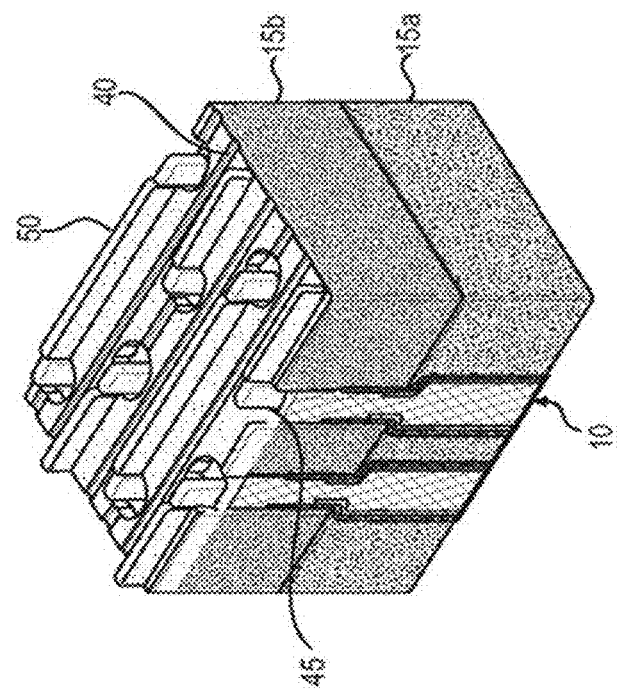

In FIG. 7, an oxide layer 50 is deposited on the SOI fins 40 and polysilicon fins 45, using conventional deposition methods. In embodiments, the oxide layer 50 can be formed using a blanket deposition of $SiO_2$, for example. In embodiments, the oxide layer 50 can be deposited to a depth of about 3 nm to 6 nm; although other thicknesses are also contemplated by the present invention. In embodiments, the oxide layer 50 will provide protection to the underlying SOI fins 40 from shorting with a subsequently formed conductive material.

Figure 8:
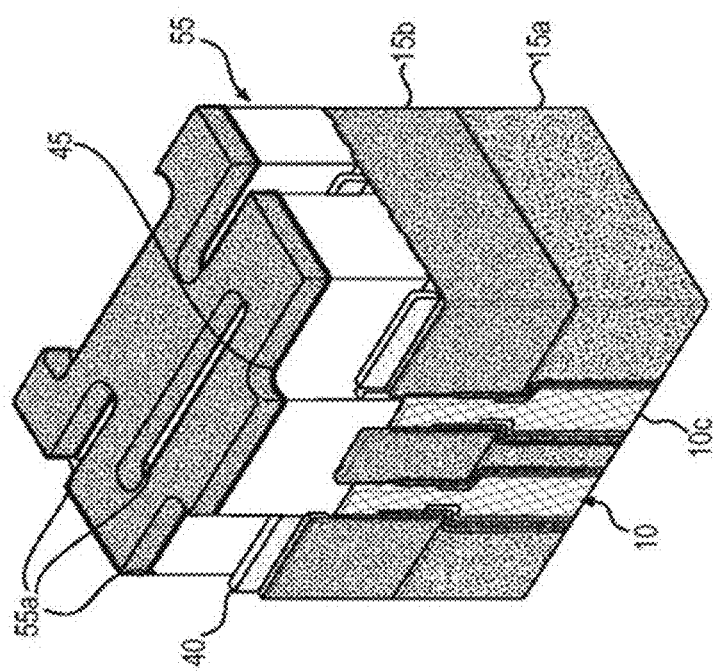
Figure 9:
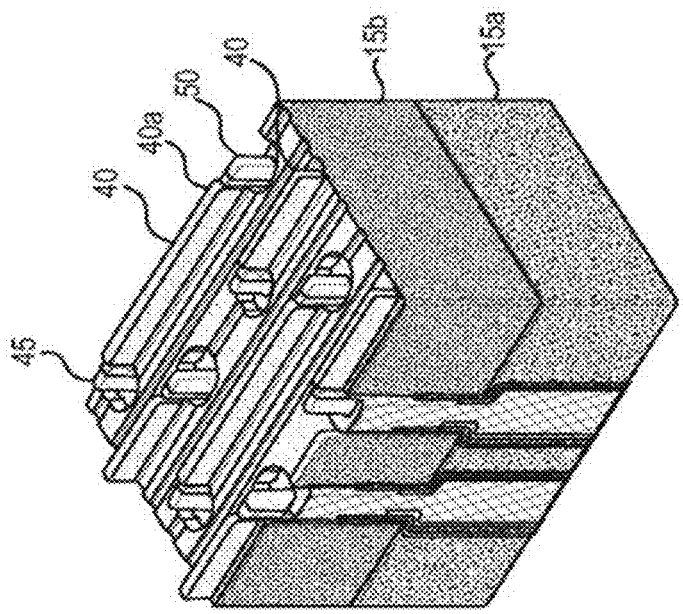

FIGS. 8 and 9 show further processing steps and respective structures in accordance with aspects of the present invention. In FIG. 8, a mask 55 is formed over the oxide layer 50. Through conventional lithography and etching processes, the oxide layer 50 is patterned to expose the SOI fins 40. The oxide layer is then removed from over the SOI fins 40. After the oxide removal process, the mask 55 layer can be removed using conventional oxygen ashing processes. As shown in FIGS. 8 and 9, as the mask 55 remains over the polysilicon fins 45 during the oxide removal process, the oxide layer 50 will remain over the polysilicon fins 45 after the etching process (see, FIG. 9). The oxide layer 50 will prevent shorts from occurring between the polysilicon fins 45 (of the deep trench capacitor) and a subsequently formed gate structure.

Figure 10:
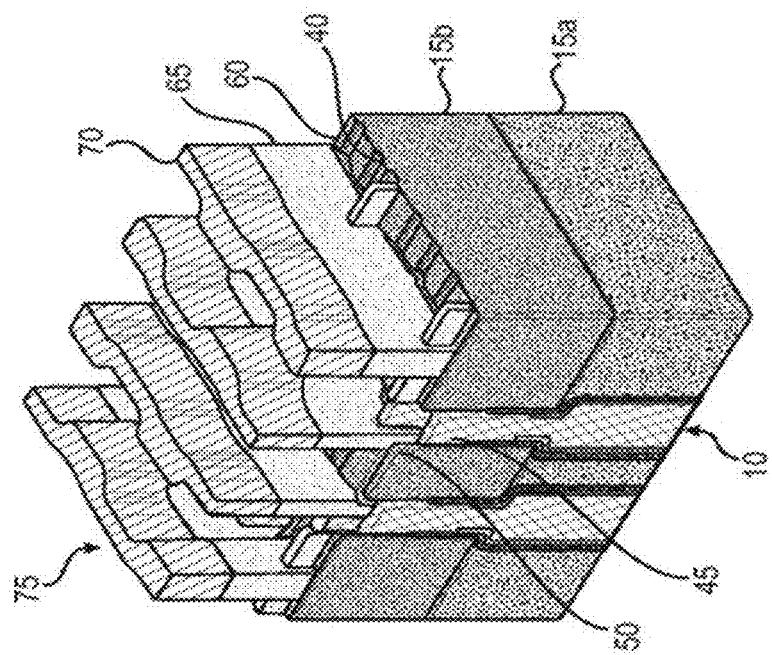

FIG. 10 shows gate formation processes in accordance with aspects of the present invention. Specifically, a gate dielectric material 60 is blanket deposited on the SOI fins 40 and other structures shown, for example, in FIG. 9, e.g., over the oxide layers 15b and 50. In embodiments, the gate dielectric material 60 can be deposited to a thickness of about 2 nm to 3 nm; although other thicknesses are also contemplated by the present invention. In embodiments, the gate dielectric material 60 can be a high-k dielectric material, e.g., hafnium oxide, or other high quality dielectric material, e.g., $SiO_2$. A semiconductor material 65, e.g., Si, is deposited on the gate dielectric material 60. In embodiments, the semiconductor material 65 is insulated from the polysilicon film 45 by the oxide material 50, thereby preventing shorts in the deep trench capacitor 10. A capping material 70, e.g., Ni, is then deposited on the semiconductor material 65. The materials 60, 65 and 70 are then patterned using conventional lithography and etching processes, to form gate structures 75.

Figure 11:
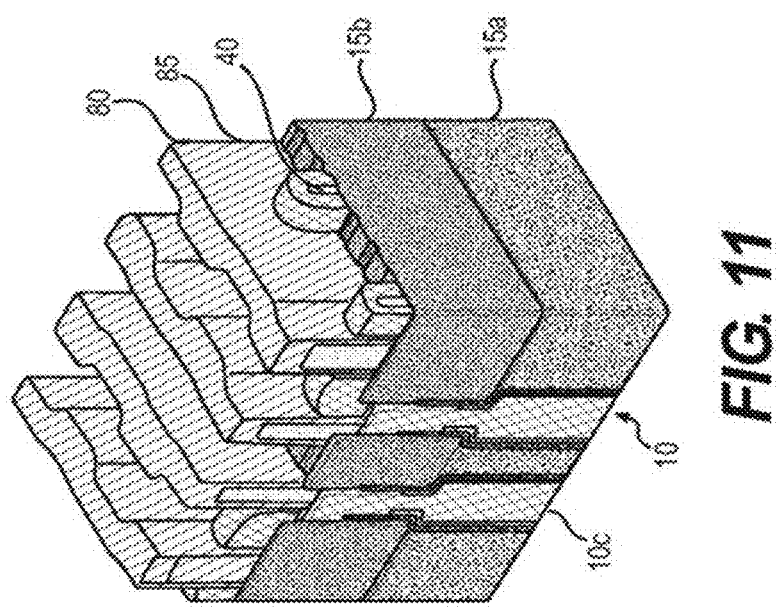

As shown in FIG. 11, sidewalls 80 are formed on the gate structures 75. In embodiments, the sidewalls 80 are formed by a blanket deposition of nitride (or other spacer material, e.g., oxide), followed by an anisotropic etch to remove the material from horizontal surfaces, e.g., over exposed portions of the fins 40, oxide material 15b, etc. In optional embodiments, an epitaxial material 85 is selectively grown on the exposed SOI fins 40 and polysilicon fins 45, to provide a robust connection between the SOI fins 40 and the polysilicon fins 45. In embodiments, the epitaxial material 85 is silicon, grown to a depth of about 15 nm to 25 nm to reduce strap resistance, thus making a more robust connection between the SOI fins 40 and the polysilicon fins 45.

Figure 12:
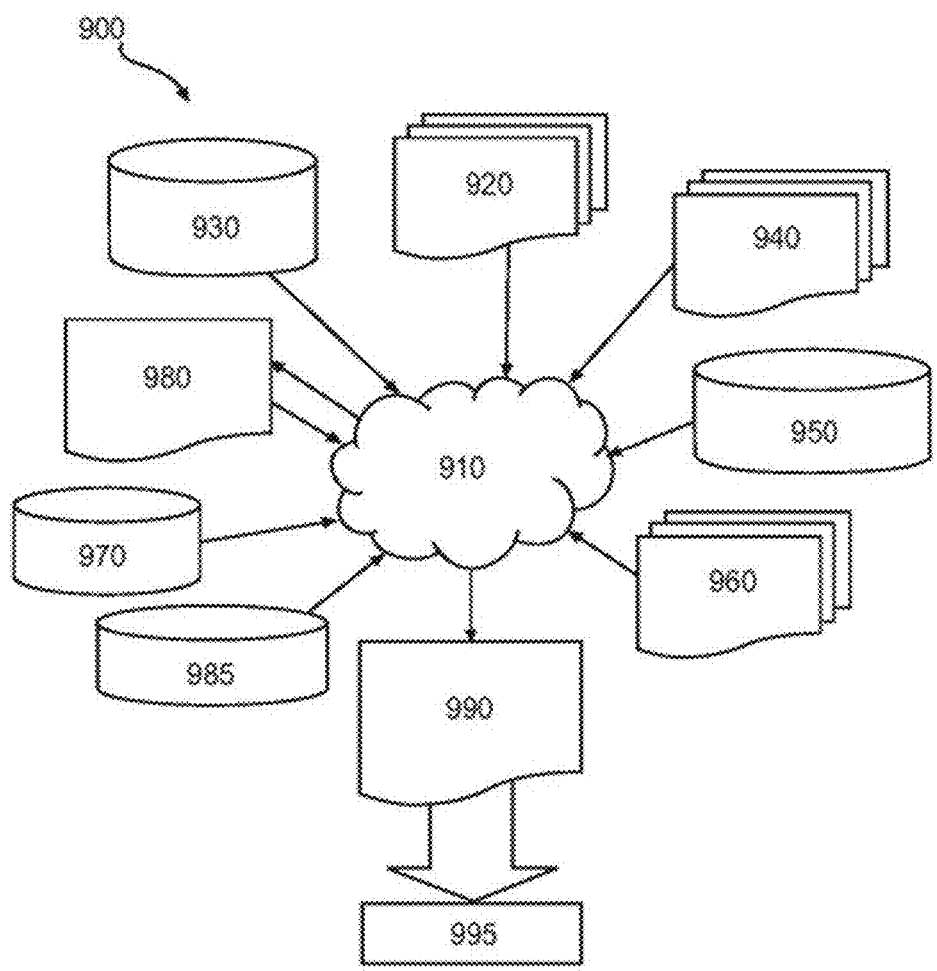
FIG. 12 is a flow diagram of a design process used in semiconductor design, manufacture, and/or test.

FIG. 12 is a flow diagram of a design process used in semiconductor design, manufacture, and/or test. FIG. 12 shows a block diagram of an exemplary design flow 900 used for example, in semiconductor IC logic design, simulation, test, layout, and manufacture. Design flow 900 includes processes, machines and/or mechanisms for processing design structures or devices to generate logically or otherwise functionally equivalent representations of the design structures and/or devices described above and shown in FIGS. 1-11. The design structures processed and/or generated by design flow 900 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 900 may vary depending on the type of representation being designed. For example, a design flow 900 for building an application specific IC (ASIC) may differ from a design flow 900 for designing a standard component or from a design flow 900 for instantiating the design into a programmable array, for example a programmable gate array (PGA) or a field programmable gate array (FPGA) offered by ALTERA® Inc. or XILINX® Inc.

FIG. 12 illustrates multiple such design structures including an input design structure 920 that is preferably processed by a design process 910. Design structure 920 may be a logical simulation design structure generated and processed by design process 910 to produce a logically equivalent functional representation of a hardware device. Design structure 920 may also or alternatively comprise data and/or program instructions that when processed by design process 910, generate a functional representation of the physical structure of a hardware device. Whether representing functional and/or structural design features, design structure 920 may be generated using electronic computer-aided design (ECAD) such as implemented by a core developer/designer. When encoded on a machine-readable data transmission, gate array, or storage medium, design structure 920 may be accessed and processed by one or more hardware and/or software modules within design process 910 to simulate or otherwise functionally represent an electronic component, circuit, electronic or logic module, apparatus, device, or system such as those shown in FIGS. 1-11. As such, design structure 920 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 910 preferably employs and incorporates hardware and/or software modules for synthesizing, translating, or otherwise processing a design/simulation functional equivalent of the components, circuits, devices, or logic structures shown in FIGS. 1-11 to generate a netlist 980 which may contain design structures such as design structure 920. Netlist 980 may comprise, for example, compiled or otherwise processed data structures representing a list of wires, discrete components, logic gates, control circuits, I/O devices, models, etc. that describes the connections to other elements and circuits in an integrated circuit design. Netlist 980 may be synthesized using an iterative process in which netlist 980 is resynthesized one or more times depending on design specifications and parameters for the device. As with other design structure types described herein, netlist 980 may be recorded on a machine-readable data storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 910 may include hardware and software modules for processing a variety of input data structure types including netlist 980. Such data structure types may reside, for example, within library elements 930 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 940, characterization data 950, verification data 960, design rules 970, and test data files 985 which may include input test patterns, output test results, and other testing information. Design process 910 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 910 without deviating from the scope and spirit of the invention. Design process 910 may also include modules for performing standard circuit design processes such as timing analysis, verification, design rule checking, place and route operations, etc.

Design process 910 employs and incorporates logic and physical design tools such as HDL compilers and simulation model build tools to process design structure 920 together with some or all of the depicted supporting data structures along with any additional mechanical design or data (if applicable), to generate a second design structure 990.

Design structure 990 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 920, design structure 990 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-11. In one embodiment, design structure 990 may comprise a compiled, executable HDL simulation model that functionally simulates the devices shown in FIGS. 1-11.

Design structure 990 may also employ a data format used for the exchange of layout data of integrated circuits and/or symbolic data format (e.g. information stored in a GDSII (GDS2), GL1, OASIS, map files, or any other suitable format for storing such design data structures). Design structure 990 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1-11. Design structure 990 may then proceed to a stage 995 where, for example, design structure 990: proceeds to tape-out, is released to manufacturing, is released to a mask house, is sent to another design house, is sent back to the customer, etc.

The methods as described above are used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed:

1. A structure, comprising:
   a plurality of deep trench capacitors formed in a silicon on insulator (SOI) substrate, each of the plurality of deep trench capacitors having a fin structure;
   a plurality of SOI fins each of which having ends in contact with respective fin structures of the deep trench capacitors;
   an insulator material on the fin structures of the plurality of deep trench capacitors;
   a gate structure extending over the insulator material and the SOI fins;
   an epitaxial material on ends of the SOI fins and ends of the fin structures of the deep trench capacitors to provide a connection between the SOI fins and the fin structures of the deep trench capacitors; and
   a gate dielectric material over the SOI fins,
   wherein each of the SOI fins are between the fin structures of the deep trench capacitors such that the ends of the SOI fins contact the ends of the fin structures of the deep trench capacitors,
   the fin structures are polysilicon fins formed in contact with the SOI fins,
   the deep trench capacitors are eDRAM structures, and
   the epitaxial material comprises semiconductor material over exposed sidewalls of the polysilicon fins and semiconductor material of the SOI fins.

2. The structure of claim 1, wherein the semiconductor material is silicon.

3. The structure of claim 1, wherein ends of the SOI fins are connected to respective polysilicon fins.

4. The structure of claim 1, wherein the ends of the SOI fins contact ends of the fin structures of the deep trench capacitors in a longitudinal direction.

5. The structure of claim 4, wherein the epitaxial material comprises silicon at a depth of about 15 nm to 25 nm to reduce strap resistance and make a robust connection between the plurality of SOI fins and the respective fin structures of the deep trench capacitors.

6. The structure of claim 1, wherein the gate structure comprises the gate dielectric material, another semiconductor material over the gate dielectric material, and a capping material over the another semiconductor material.

7. The structure of claim 6, wherein the gate dielectric material is one of hafnium oxide and $SiO_2$, the another semiconductor material is silicon, and the capping material is nickel.

8. The structure of claim 7, wherein the another semiconductor material is insulated from the polysilicon fins by an oxide material to prevent shorts in the deep trench capacitors.

9. The structure of claim 1, wherein the ends of the SOI fins and the ends of the fin structures of the deep trench capacitors are longitudinal ends.

10. The structure of claim 1, further comprising sidewalls on the gate structure.

11. A structure, comprising:
    a plurality of deep trench capacitors formed in a silicon on insulator (SOI) substrate, each of the plurality of deep trench capacitors having a fin structure;
    a plurality of SOI fins each of which having ends in contact with respective fin structures of the deep trench capacitors;

an insulator material on the fin structures of the plurality of deep trench capacitors;
a gate structure extending over the insulator material and the SOI fins;
an epitaxial material on ends of the SOI fins and ends of the fin structures of the deep trench capacitors to provide a connection between the SOI fins and the fin structures of the deep trench capacitors; and
a gate dielectric material over the SOI fins,
wherein each of the SOI fins are between the fin structures of the deep trench capacitors such that the ends of the SOI fins contact the ends of the fin structures of the deep trench capacitors,
the fin structures are polysilicon fins formed in contact with the SOI fins,
the SOI fins comprise portions of FinFETs, and
the epitaxial material comprises semiconductor material over exposed sidewalls of the polysilicon fins and semiconductor material of the SOI fins.

12. A structure, comprising:
a plurality of deep trench capacitors formed in a silicon on insulator (SOI) substrate, each of the plurality of deep trench capacitors having a fin structure;
a plurality of SOI fins each of which having ends in contact with respective fin structures of the deep trench capacitors;
an insulator material on the fin structures of the plurality of deep trench capacitors;
a gate structure extending over the insulator material and the SOI fins;
an epitaxial material on ends of the SOI fins and ends of the fin structures of the deep trench capacitors to provide a connection between the SOI fins and the fin structures of the deep trench capacitors,
wherein each of the SOI fins are between the fin structures of the deep trench capacitors such that the ends of the SOI fins contact the ends of the fin structures of the deep trench capacitors,
the fin structures are polysilicon fins formed in contact with the SOI fins,
the insulator material is blanket $SiO_2$ material on the polysilicon fins deposited to a depth which provides protection to the SOI fins from shorting with a conductive material,
the insulator material is blanket deposited using $SiO_2$ to a depth of about 3 nm to 6 nm to provide protection to the SOI fins from shorting with a conductive material, and
the epitaxial material comprises semiconductor material over exposed sidewalls of the polysilicon fins and semiconductor material of the SOI fins.

\* \* \* \* \*